(12) United States Patent
Ananthapur Bache et al.

(10) Patent No.: US 10,627,911 B2
(45) Date of Patent: *Apr. 21, 2020

(54) REMOTE INTERACTION WITH CONTENT OF A TRANSPARENT DISPLAY

(71) Applicant: International Business Machines Corporation, Armonk, NY (US)

(72) Inventors: Vijay Kumar Ananthapur Bache, Bangalore (IN); Vijay Ekambaram, Chennai (IN); Sarbajit K. Rakshit, Kolkata (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 15/496,538

(22) Filed: Apr. 25, 2017

(65) Prior Publication Data
US 2018/0307317 A1   Oct. 25, 2018

(51) Int. Cl.
*G06F 3/01* (2006.01)
*G06F 3/0346* (2013.01)
(Continued)

(52) U.S. Cl.
CPC .............. *G06F 3/017* (2013.01); *G06F 3/014* (2013.01); *G06F 3/0346* (2013.01);
(Continued)

(58) Field of Classification Search
CPC ................... G06F 3/017; G06F 3/0346; G06F 2203/04804; G06F 3/014; G06F 3/04845; G06F 3/04883
See application file for complete search history.

(56) References Cited

U.S. PATENT DOCUMENTS

| 8,744,528 B2 | 6/2014 | Kim et al. |
| 8,941,683 B2 | 1/2015 | Son et al. |

(Continued)

OTHER PUBLICATIONS

Wolfgang Buschel et al., Towards Interaction with Transparent and Flexible Displays, CHI 2013 Workshop on Displays Take New Shape: An Agenda for Interactive Surface, Apr. 28, 2013, Paris, France.

(Continued)

*Primary Examiner* — Tadesse Hailu
(74) *Attorney, Agent, or Firm* — Alexander G. Jochym

(57) ABSTRACT

An approach using a computer to map a transparent display to a hand of a user, wherein the mapping is based on sets of mapping sensor data associated with a plurality of systematic movements of a second hand of the user on the first hand of the user. The approach includes receiving sensor data associated with one or more movements of the second hand of user associated to the first hand of the user and determining the sensor data corresponds to a content on the transparent display. Additionally, the approach includes determining whether the sensor data is associated with more than one side of the transparent display. When the sensor data is not associated with more than one side of the transparent display, the approach includes determining a manipulation of the content on a side of the transparent display corresponding to the sensor data.

20 Claims, 7 Drawing Sheets

(51) Int. Cl.
  *G06F 3/0484* (2013.01)
  *G06F 3/0488* (2013.01)
(52) U.S. Cl.
  CPC ...... *G06F 3/04845* (2013.01); *G06F 3/04883* (2013.01); *G06F 2203/0331* (2013.01); *G06F 2203/04804* (2013.01)

(56) References Cited

U.S. PATENT DOCUMENTS

| | | | |
|---|---|---|---|
| 9,152,173 | B2 | 10/2015 | Lee et al. |
| 9,372,617 | B2 | 6/2016 | Jeon et al. |
| 9,646,522 | B2 | 5/2017 | Ratcliff et al. |
| 2012/0256886 | A1 | 10/2012 | Ryu et al. |
| 2014/0002486 | A1 | 1/2014 | Ratcliff et al. |
| 2014/0009415 | A1 | 1/2014 | Nishida |
| 2014/0035942 | A1 | 2/2014 | Yun et al. |
| 2014/0139458 | A1 | 5/2014 | Premutico |
| 2014/0144083 | A1 | 5/2014 | Artwohl |
| 2014/0145989 | A1* | 5/2014 | Lee ............... G06F 3/04886 345/173 |
| 2014/0185282 | A1 | 7/2014 | Hsu et al. |
| 2014/0267024 | A1 | 9/2014 | Keller et al. |
| 2014/0306900 | A1* | 10/2014 | Son ............... G06F 3/041 345/173 |
| 2015/0040040 | A1 | 2/2015 | Balan et al. |
| 2015/0042580 | A1 | 2/2015 | Shim et al. |
| 2015/0091780 | A1 | 4/2015 | Lyren |
| 2015/0248235 | A1 | 9/2015 | Offenberg et al. |
| 2015/0253862 | A1* | 9/2015 | Seo ............... G06F 3/017 715/863 |
| 2015/0253930 | A1* | 9/2015 | Kozloski ............... G06F 3/04817 345/175 |
| 2015/0277559 | A1 | 10/2015 | Vescovi et al. |
| 2016/0224123 | A1 | 8/2016 | Antoniac et al. |
| 2016/0309090 | A1 | 10/2016 | Park et al. |
| 2016/0313798 | A1 | 10/2016 | Connor |
| 2016/0353055 | A1 | 12/2016 | Popescu |
| 2016/0371885 | A1 | 12/2016 | Gavrilliuc et al. |
| 2017/0148221 | A1 | 5/2017 | Lyren |

OTHER PUBLICATIONS

Li, "Two-Sided Transparent Display as a Collaborative Medium", University of Calgary, Jan. 2015, 137 pps.
"See-through display", Wikipedia, Dec. 10, 2016, 4 pps., <https://en.wikipedia.org/wiki/See-through_display>.
"Transparent OLEDs: introduction and market status", OLED-Info ©2004-2017 Metalgrass software, 7 pps., <http://www.oled-info.com/transparent-oleds>.
Webb, "Samsung files patent for a phone with Two Screens to make reading, gaming and conference calls easier", Dec. 18, 2013, 34 pps., <www.dailymail.co.uk/sciencetech/article-2525812/Double-vision-Samsung-unveils-phone-two-screens-easier-reading-gaming-video-conferencing.html>.
Welch, "Panasonic's transparent display is hard for your eyes to believe", The Verge, Jan. 7, 2016, 3 pps., <http://www.theverge.com/2016/1/7/10733626/panasonic-transparent-screen-display-ces-2016>.
Appendix P: List of IBM Patents or Patent Applications Treated as Related, Filed Nov. 1, 2017, pp. 1-2.
U.S. Appl. No. 15/800,382, filed Nov. 1, 2017; Entitled "Remote Intercation With Content of a Transparent Display".
Appendix P: List of IBM Patents or Patent Applications Treated as Related, Filed Herewith, pp. 1-2.
U.S. Appl. No. 16/354,427, filed Mar. 15, 2019; Entitled "Remote Interaction With Content of a Transparent Display".
U.S. Appl. No. 15/800,382, filed Nov. 1, 2017; Entitled "Remote Interaction With Content of a Transparent Display".

* cited by examiner

REMOTE INTERACTION WITH CONTENT OF A TRANSPARENT DISPLAY

BACKGROUND OF THE INVENTION

The present invention relates generally to the field of computer display technology and more particularly to remotely providing input associated with content on a transparent display.

A transparent display is an electronic display that allows a user to view content shown on either side of a display screen while still being able to see to the real world through the transparent display. Emerging commercial uses of transparent displays, for example, include augmented reality applications, virtual reality gaming, and the use of transparent displays in commercial settings such as a store window providing promotions, messages on current new products, or additional visuals overlaying store window displays.

Typically, transparent displays may add, erase, move, or otherwise manipulate display content such as images, words, graphs, or other digitally generated content in response to a user input provided through a user's touch on the transparent display or by a user gesture captured by a digital camera. In some cases, transparent displays may add, delete, or otherwise manipulate displayed content in response to a user input on a computing device such as a smart phone, tablet, computer, or the like using a conventional user interface such as a touch screen, keyboard, or mouse of the computing device.

SUMMARY

Embodiments of the present invention disclose a method, a computer program product, and a system for one or more computers to map a transparent display to a first hand of a user, wherein the mapping is based, at least in part, on one or more sets of mapping sensor data associated with a plurality of systematic movements of a second hand of the user on the first hand of the user. The method includes one or more computers receiving a first set of sensor data associated with one or more movements of the second hand of user associated to the first hand of the user and determining the first set of sensor data corresponds to at least one content on the transparent display. Additionally, the method includes determining whether the first set of sensor data is associated with more than one side of the transparent display. Responsive to determining the first set of sensor data is not associated with more than one side of the transparent display, the method includes determining a manipulation of the at least one content on a side of the transparent display corresponding to the first set of sensor data.

DETAILED DESCRIPTION

Embodiments of the present invention recognize that in some instances a transparent display may be too large to allow a user to provide an input by touch on a second side of the transparent display without walking around the transparent display. Embodiments of the present invention recognize that a large transparent display can prohibit a user from providing input by touch simultaneously to both sides of the transparent display. Embodiments of the present invention recognize that not all users have access to imaging devices with associated image analysis programs. Embodiments of the present invention recognize that not all users desire a visual image analysis of arm or hand gestures captured by a digital imaging device or camera as a method to provide user input for the manipulation of data or other content on a transparent display due to potential visual image background noise from movements of other nearby individuals.

Embodiments of the present invention provide a method for the manipulation of content on both sides of a transparent display. Embodiments of the present invention allow a user to provide instructions to a second side of a transparent display without reaching or walking around the transparent display. Embodiments of the present invention provide a method for providing user input for remote interactions of a user to a transparent display. Embodiments of the present invention include a method for receiving user input using sensor data associated with a user's muscle movements or vibrations created as a user's first hand contacts or moves on the user's second hand and the received sensor data is correlated to a content on a transparent display or an action associated with the transparent display. Embodiments of the present invention provide a method to receive user inputs such as sensor data associated with a content on a transparent display or an action of a transparent display without erroneously receiving instructions generated by another nearby user moving his or her hands or arms.

Figure 1:
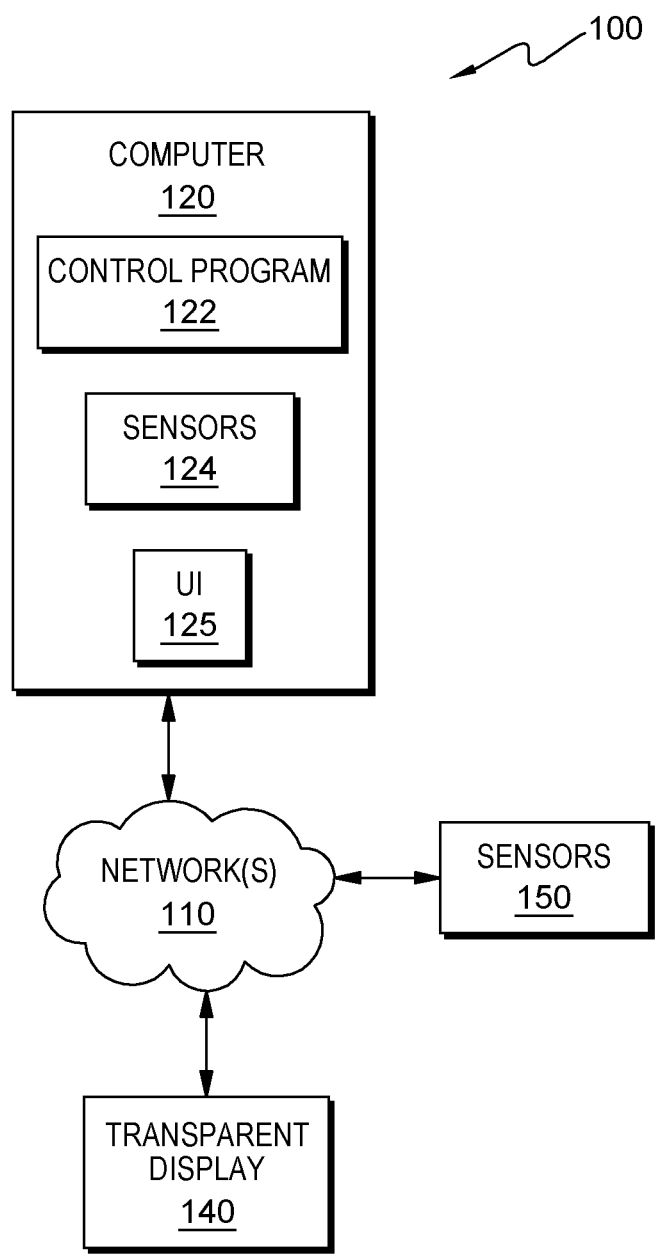
FIG. 1 is a functional block diagram illustrating a distributed data processing environment, in accordance with at least one embodiment of the present invention.

FIG. 1 is a functional block diagram illustrating a distributed data processing environment, generally designated 100, in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, distributed data processing environment 100 includes computer 120, transparent display 140, and sensors 150 all interconnected over network 110. Network 110 can include, for example, wireless local area network (WLAN), a telecommunications network, a local area network (LAN), a virtual LAN (VLAN), a wide area network (WAN), such as the Internet, or a combination of the these, and can include wired or wireless connections. Network 110 can include one or more wireless networks and/or wired networks that are capable of receiving and transmitting data including wireless data such as sensor data, radio waves, infrared signals, electrical signals, and other similar signals for data transmission. In general, network 110 can be any combination of connections and protocols that will support communications between computer 120, transparent display 140, and sensors 150 along with other computing devices (not shown) within distributed data processing environment 100.

Computer 120 can be a smart watch, a smart ring, a smart armband, a fitness tracking device, a smart phone, a laptop computer, a tablet computer, a desktop computer, or any programmable electronic device capable of communicating with various components and devices within distributed data processing environment 100, via network 110. In general, computer 120 represents any programmable electronic device or combination of programmable electronic devices capable of executing machine-readable program instructions and communicating with other computing devices within distributed data processing environment 100 via a network, such as network 110. In various embodiments, computer 120 includes sensors 124 capable of detecting a motion, a movement, and/or location of a first hand of a user or a digit of the first hand of the user with respect to a second hand of the user. In some embodiments, computer 120 includes an instance of user interface (UI) 125. In various embodiments, computer 120 receives sensor data from one or both of sensors 124 and sensors 150. Computer 120 accesses transparent display 140 and other computer devices (not depicted in FIG. 1) via network 110, for example, to receive sensor data and provide inputs to transparent display 140 for manipulation and display of content on transparent display 140. Computer 120 may include internal and external hardware components, as depicted and described in further detail with respect to FIG. 6.

Control program 122 resides in computer 120. In various embodiments, control program 122 receives sensor data from sensors 124 and/or sensors 150. In various embodiments, control program 122 determines an action or a manipulation of selected content on transparent display 140 based, at least in part, on received sensor data (e.g., as user inputs). In an embodiment, control program 122 receives user input for a selection of content for manipulation of content on transparent display 140 from one or more user selected buttons on UI 125 (e.g., when UI 125 is a two-sided remote input device). In one embodiment, control program 122 receives user input for a selection of content for manipulation of content on transparent display 140 from a touch on a two-sided touch screen used for UI 125.

In various embodiments, control program 122 maps a hand of a user to transparent display 140. For example, control program 122 maps a right hand of a user to transparent display 140 based, at least in part, on received sensor data associated with a movement of a digit such as a finger or a thumb of a left hand of the user along or on the user's right hand. In various embodiments, control program 122 maps one or more sides of a user's hand to one or more sides of transparent display 140. For example, control program 122 moves a finger of the left hand systematically around the palm of the user's right hand to map the palm of the right hand to a front side of transparent display 140. In one embodiment, control program 122 maps a grid of buttons on each side of a two-sided remote input device design for UI 125 to transparent display 140 (e.g., a first side of UI 125 to a first side of transparent display 140). In an embodiment, control program 122 includes instructions mapping UI 125 as a two-sided touch screen to transparent display 140.

After completion of mapping sensor data and/or UI 125 to transparent display 140, in various embodiments, control program 122 receives, as user input, sensor data from sensors 124 or sensors 150 associated with a movement or a touch of a first hand of the user on a second hand of the user. Control program 122 can receive sensor data associated with one or more sides of a user's mapped hand or associated with a gesture (e.g., a cupped palm or a fist) of the user's mapped hand. In an embodiment, control program 122 receives a user input from UI 125 as a two-sided remote input device or UI 125 as a two-sided touch screen. Control program 122 determines an action or manipulation of a selected content on transparent display 140 corresponding to the received sensor data or UI 125 input. In various embodiments, control program 122 determines an orientation for content transferred or moved from one side of transparent display 140 to the other side of transparent display 140 (e.g., reverses or flips content appropriately to display content in the same manner on the second side of transparent display 140 as viewed on the first side of transparent display 140). In various embodiments, control program 122 provides instructions to transparent display 140 to perform one or more of the following: manipulate content, select content, move content, orient content, display content, delete content, add content, rotate content, or perform an action (e.g., locking transparent display) on one or both sides of transparent display 140 in response to received sensor data received in association with one or both sides of a user's second hand. Control program 122 receives and sends data or instructions to and from transparent display 140. In various embodiments, control program 122 sends and receives user input (e.g., sensor data) from sensors 124, sensors 150, or UI 125.

Sensors 124 and sensors 150 capture and send data to control program 122 generated by movements or gestures of a user's first hand on a user's second hand. In various embodiments, sensors 124 and/or sensors 150 provide sensor data to control program 122 as a user input to determine a selection of content on transparent display 140, a manipulation of content on transparent display 140, or an action of transparent display 140. In various embodiments, sensors 124 and/or sensors 150 are one or more sensors capable of detecting muscle movements, vibrations, or other similar, non-visual indication of hand motions such as a movement or touch of a user's first hand on one or more locations on either side of a user's second hand. Sensors 124 and 150 can employ one or more of known motion and/or location determination methods such as vibration sensing or muscle movement sensing devices associated with a first hand of a user. For example, sensor 124 and sensors 150 determine muscle movements, vibrations associated with a movement of a hand along another hand, or a location on a hand of a user using one or more of known sensing technologies such as precision vibration sensors, surface electromyography sensors, gyroscope sensors, reflected infrared light, piezoelectric films, or the like. In some embodiments, sensors 124 and/or sensors 150 determine a location of a hand using one or more known location determination methods (e.g., as used in robotics technology) such as sensor gloves or multiple sensors in a smart armband, smart watch and the like. In various embodiments, computer 120 includes sensors 124 (e.g., as sensors integrated in a smart watch, a fitness tracking device, a smart ring, a smart armband, a sensor glove, a smart sensor glove, etc.). In an embodiment, computer 120 receives sensor data via network 110 from sensors 150. For example, sensors 150 are not integrated in computer 120 but are independent sensors such as a piezo-electric film or vibration sensors attached directly to one or both hands of the user. For example, sensors 150 can be attached to the user's skin along a hand, a wrist, or an arm, in a glove, on a fingernail, a ring, a wristband, or the like without processing capability or limited processing capability. In various embodiments, sensors 124 or sensors 150 provide data to control program 122 associated with a systematic movement of a user's first hand over each surface of a user's second hand used to map a surface of the user's second hand to a side of transparent display 140.

User interface (UI) 125 provides an interface for a user of computer 120 to control program 122, transparent display 140, and other computing devices in distributed data processing environment 100 (not shown). In various embodiments, user interface 125 may be a two-sided remote input device, a two-sided touch screen, a graphical user interface (GUI) or a web user interface (WUI). In various embodiments, UI 125 can receive user input such as instructions for operation, and include the information (such as graphics, text, and the like) communicated to control program 122 and transparent display 140 to present information to a user on transparent display 140. In another embodiment, UI 125 may also be mobile application software that provides an interface between the users of computer 120 and transparent display 140. User interface 125 enables computer 120 to receive a user selection of content, a location for content, or an action associated with transparent display 140. In an embodiment, UI 125 is a two-sided remote input device with a grid of buttons on each side of the two-sided remote input device (e.g., UI 125) each button mapped to a corresponding location on transparent display 140 and a row buttons on each side of UI 125 associated with an action to occur on transparent display 140. UI 125 as a two-sided remote input device receives user inputs via a selection of one or more buttons on one or both sides of UI 125 in order to provide instructions to transparent display 140. In one embodiment, UI 125 is a two-sided touch screen.

Transparent display 140 is a transparent display capable of presenting content such as pictures, graphs, and other electronic data on any side of the display (e.g., on any sided of a multi-sided transparent display). Content for transparent display 140 may include but, is not limited to, images, graphs, numbers, symbols, words, files, videos, code, or other digital data displayed on transparent display 140. In various embodiments, transparent display 140 presents content on either side of transparent display. Transparent display 140 allows a user to see displayed content and the environment behind the screen (e.g., the user sees through the display to observe the background or actions occurring behind transparent display 140). Transparent display 140 receives data and instructions via network 110 from control program 122. Responsive to instructions received from control program 122, transparent display 140 performs actions such as unlocking the display, deleting/adding content, or manipulating content such as moving identified content from one side of transparent display 140 to an identified location on the other side of transparent display 140. In various embodiments, transparent display 140 receives instructions or data from control program 122 determined in response to a user input received by sensors 124 or sensors 150 generating sensor data as a digit of the user's first hand moves with respect to one or both sides of the user's second hand. In an embodiment, transparent display 140 receives instructions or data from UI 125 that is one of a two-sided touch screen or a two-sided remote input device which maybe a separate remote input device or integrated in computer 120 (as depicted).

Figure 2A:
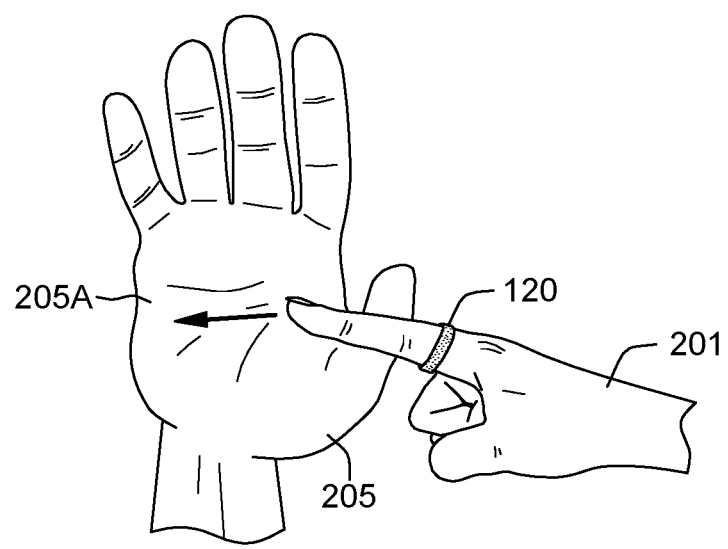
FIGS. 2A and 2B are an illustration of a method to select and manipulate content on a side of a transparent display, in accordance with an embodiment of the present invention.
Figure 2B:
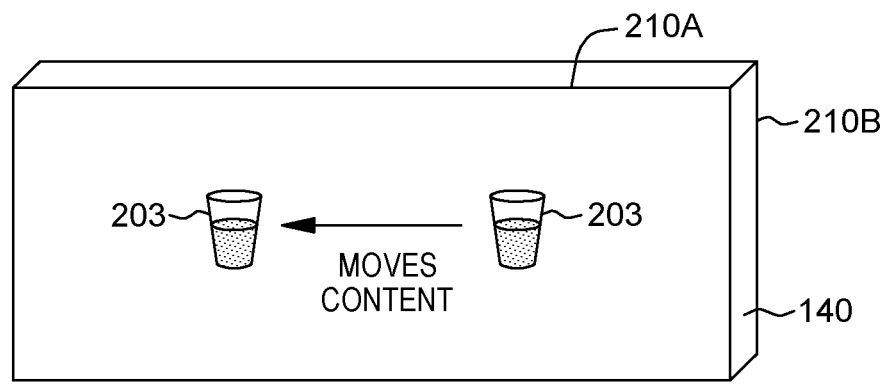

FIGS. 2A and 2B are an illustration of a method to select and manipulate content 203 on side 210A of transparent display 140 using data from sensors in computer 120 on hand 201, in accordance with an embodiment of the present invention. As depicted, FIG. 2A includes hand 201, computer 120 (e.g., a smart ring with sensors 124 not depicted), hand 205, palm 205A, transparent display 140, side 210A, side 210B, and content 203 (e.g., a glass of water). FIG. 2A depicts hand 201 with computer 120 (e.g., a smart ring with sensors) touching hand 205 on palm 205A in a first location sliding to a second location on palm 205A occurring after computer 120 receives a user input for a generation of instructions to transparent display 140. FIG. 2B is a corresponding illustration of transparent display 140 moving content 203 from the right side of side 210A to the left side of side 210A. The movement of content 203 on transparent display 140 is determined by computer 120 using control program 122 (depicted in FIG. 1) based, at least in part, on received sensor data from sensors (depicted in FIG. 1) in computer 120 (e.g., a smart ring). Computer 120 receives sensor data such as vibration data detected by sensors in computer 120 on the finger of hand 201 as the finger moves along palm 205A of hand 205. Prior to the finger of hand 201 touching hand 205, computer 120 has mapped palm 205A of hand 205 to side 210A of transparent display 140 (e.g., from previously received sensor data as hand 201 systematically traverses each side of hand 205). Based, at least in part, on received sensor data from sensors in computer 120 as the finger moves across palm 205A and mapping of palm 205A to side 210A of transparent display 140, computer 120 sends instructions to transparent display 140 to move content 203 from the first location to a second location on transparent display 140.

Figure 3A:
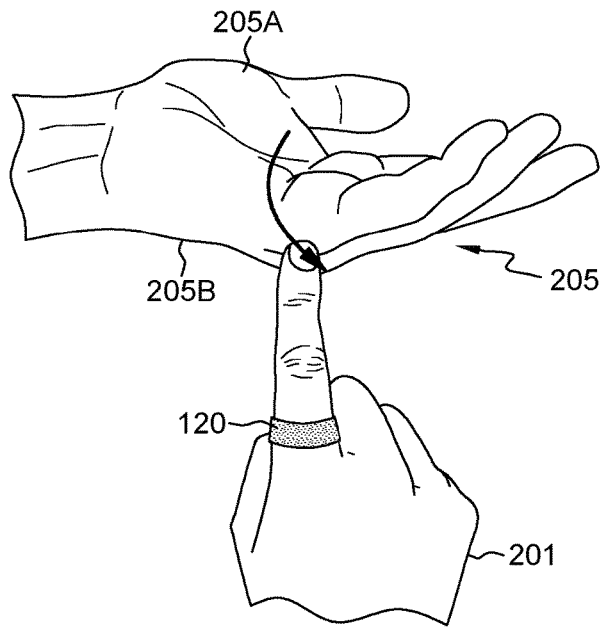
FIGS. 3A and 3B are an illustration of a method to transfer content from a side of a transparent display to another side of the transparent display, in accordance with an embodiment of the present invention.
Figure 3B:
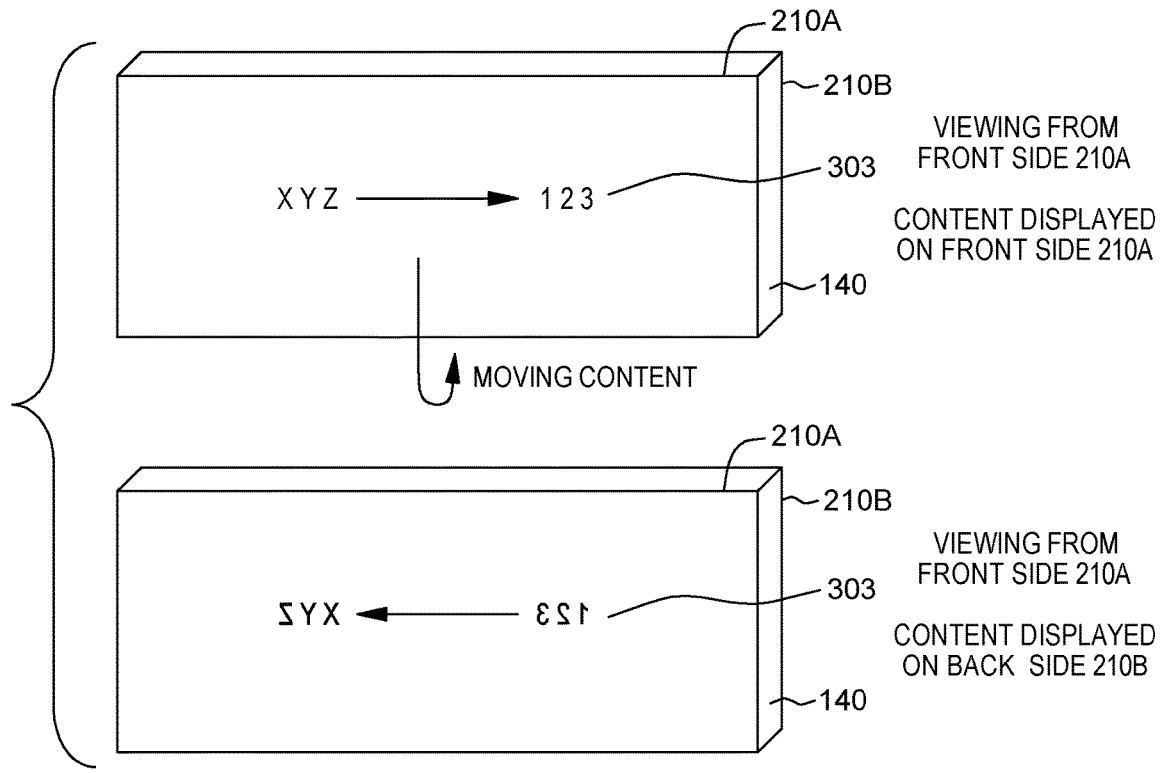

FIGS. 3A and 3B are an illustration of a method to transfer content 303 from side 210A of transparent display 140 to side 210B of transparent display 140, in accordance with an embodiment of the present invention. As depicted, FIG. 3A includes hand 201 with computer 120 (e.g., depicted as a smart ring), hand 205, palm 205A, and backside 205B of hand 205. FIG. 3B includes transparent display 140 with side 210A (e.g., front side) and side 210B (e.g., backside), content 303 on side 210A viewed from the front side of transparent display 140, and content 303 on side 210B viewed from the front side of transparent display 140.

Before receiving sensor data associated with hand 201 movements depicted in FIG. 3A, computer 120 has already mapped each side of hand 205 to a corresponding side of transparent display 140 (e.g., palm 205A mapped to side 210A) based on received sensor data. Pointer finger on hand 201 touches palm 205A and slides around the edge of palm 205A to a second location on backside 205B of hand 205 and sensors (not depicted) in computer 120 provide sensor data associated to the movement of the pointer finger on hand 205 to computer 120 (e.g., to control program 122 not depicted). In response to receiving sensor data associated with the movement of the pointer finger on hand 201 around hand 205, computer 120 determines that content 303 is moved from side 210A to a second location on side 210B of transparent display 140 as depicted in FIG. 3B and sends instructions to transparent display 140 to move content 303.

Figure 4A:
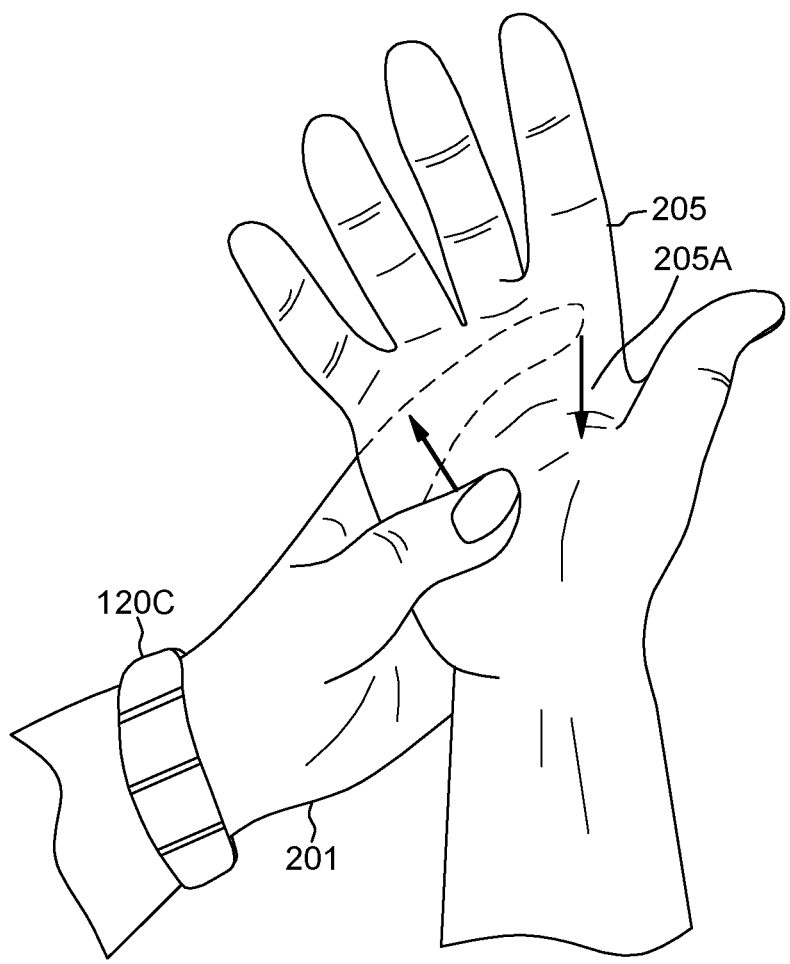
FIGS. 4A and 4B are an illustration of a method of manipulating data on both sides of a transparent display, in accordance with an embodiment of the present invention.
Figure 4B:
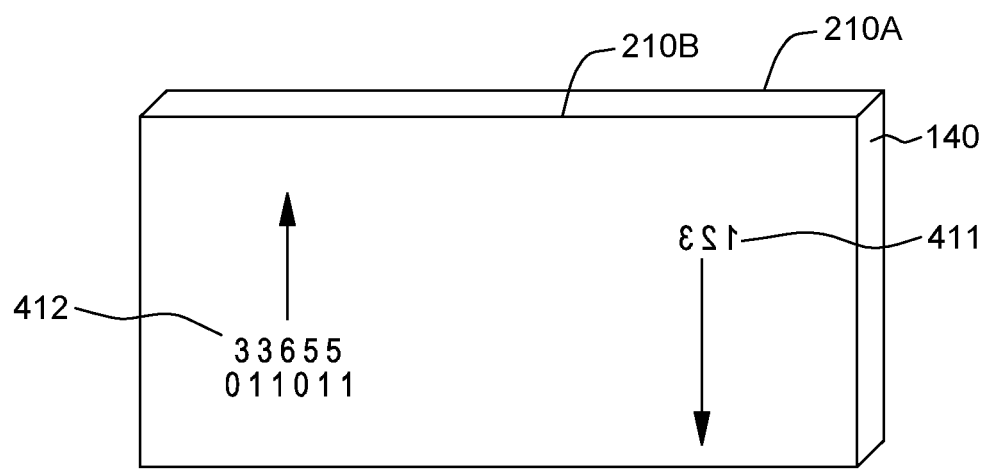

FIGS. 4A and 4B are an illustration of a method of manipulating data on both sides of transparent display 140, in accordance with an embodiment of the present invention. Using previously performed mapping of each side of transparent display 140 to each side of hand 205 of a user, computer 120C, a smart watch with sensors (not depicted) detecting muscle movements associated with the movements of the digits of hand 201, receives sensor data on the user's muscle movements from the sensors in computer 120C associated with the movement of a pointer finger of hand 201 on backside of hand 205 and the movement of a thumb of hand 201 on palm side 205A of hand 205. Sensor data from sensors (not depicted) in computer 120C provide data on muscle movements in the users wrist, using known methods known to one skilled in the art, associated with a sliding motion upward by the thumb on palm 205A of hand 205 to a location on palm 205A and a sliding motion downward by the pointer finger touching a location on backside of hand 205 to a second location on the backside of hand 205. In response to receiving the sensor data on the sliding motions and associated locations (e.g., from mapping of hand 205), computer 120 sends instructions to transparent display 140 to move content 411 on side 210B of transparent display downward and content 412 on front side 210A of transparent display 140 upward as depicted on transparent display 140 in FIG. 4B.

Figure 5A:
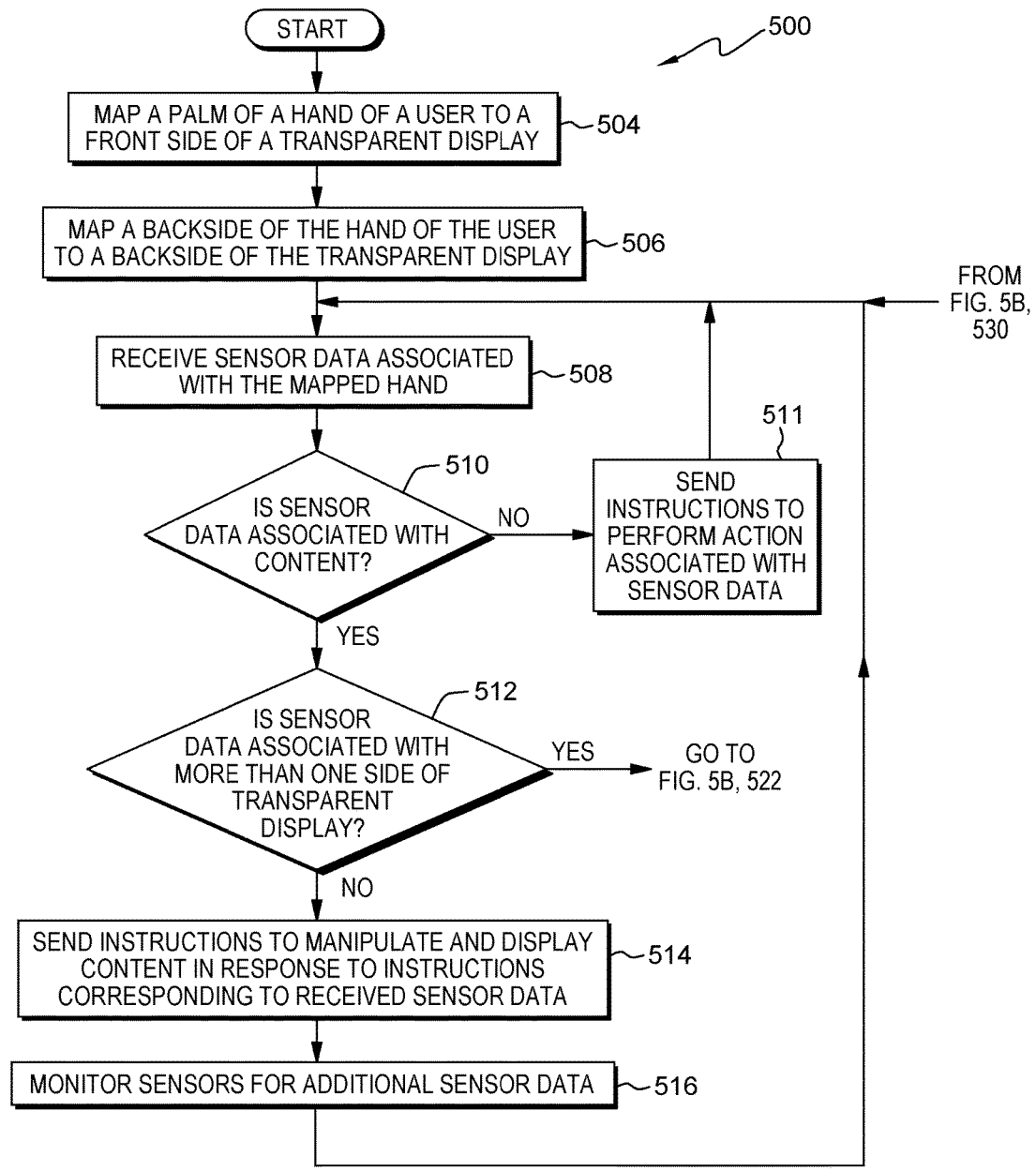
FIGS. 5A and 5B are a flowchart depicting operational steps of a method to manipulate content on a transparent display, in accordance with an embodiment of the present invention.
Figure 5B:
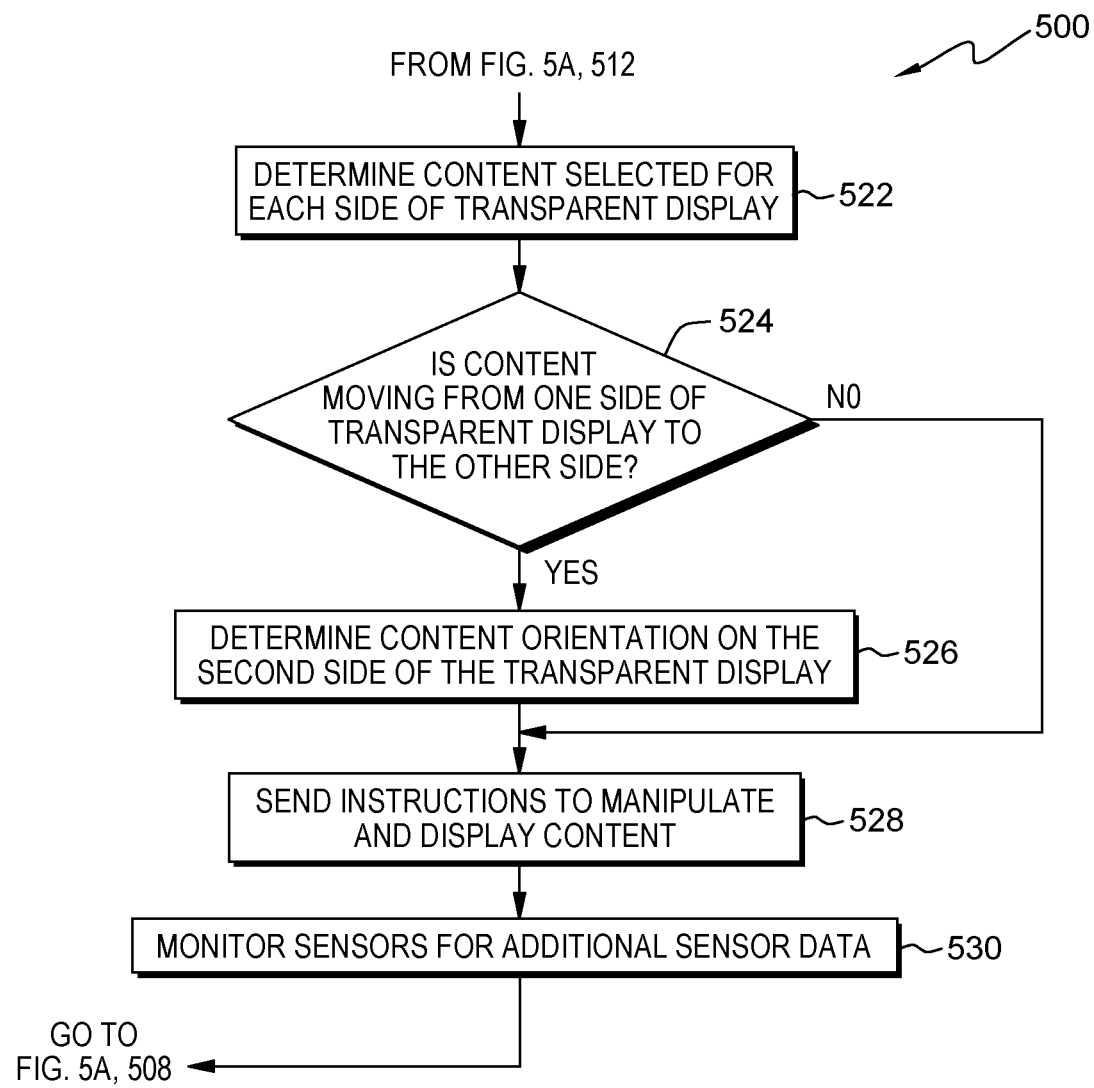

FIGS. 5A and 5B are a flowchart 500 depicting operational steps of control program 122 to manipulate content on transparent display 140, in accordance with an embodiment of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Control program 122 maps a palm of a hand of a user to a front side of transparent display 140 (504). In various embodiments, control program 122 receives sensor data or a user input on UI 125 indicating an initiation of mapping of a hand (e.g., hand 205 in FIGS. 2A, 3A, and 4A) to transparent display 140. For example, when control program 122 receives a command from a user input such as a selection of "mapping" on a pull-down menu to initiate mapping of a hand to transparent display 140. In another example, control program 122 receives sensor data (e.g., a set of sensor mapping data) associated with muscle movements or vibrations detected by sensors 124 or 150 indicating a finger on the user's other hand (e.g., hand 201 in FIGS. 2A, 3A, and 4A) rubs along or against the knuckles of fisted hand 205 to initiate of a mapping of hand 205. In an embodiment, control program 122 runs continuously in the background analyzing received sensor movement to determine an initiation of the mapping of hand 205 (e.g., when sensor data indicates a finger or thumb moving across the knuckles of fisted hand 205). In one embodiment, control program 122 initiates interactions such as mapping and generating instructions to transparent display 140 when computer 120 with sensors 124 is in proximity to transparent display 140. For example, control program 122 initiates analysis or mapping of sensor data when computer 120 and/or sensors 124 are within ten feet of transparent display 140. Computer 120 proximity to transparent display 140 may be determined using known location determination methods such as an indoor positioning system, Wi-Fi based positioning system, beacons, global positioning system, and the like. In some embodiments, control program 122 initiates analysis of received sensor data for mapping of transparent display 140 by a received user input such as a button on a smart arm band or a smart watch for computer 120, an user input or command provided from a user's smartphone, tablet, or notebook (not depicted) sent to computer 120 for the initiation of control program 122. In an embodiment, control program 122 receives sensor data from sensors 124 and/or sensors 150 associated with hand 205.

In various embodiments, control program 122 receives sensor data from sensors 124 present in computer 120 on or associated with a user's second hand (e.g., hand 201) as hand 201 moves around the palm (e.g., palm 205A in FIGS. 2A, 3A, 4A) of hand 205 to map hand 205. Computer 120 can be a smart watch, a smart ring, a smart armband, or the like on hand 201 or on a user's finger, thumb, wrist or arm associated with hand 201 of a user. In various embodiments, control program 122 receives sensor data associated with movements of hand 201 such as vibrations, muscle movements, motion data, infrared (IR) light changes, or other sensor data associated with hand 201 or muscle movements of hand 201 as hand 201 (e.g., a digit of hand 201) traverses palm 205A. The received sensor data from sensors 124 in computer 120 on hand 201 provide sensor data associated with palm 205A of hand 205 including, for example, muscle movements or vibrations related to a topology and/or a location or locations on palm 205A as a finger of thumb of hand 201 traverses palm 205A. In various embodiments, control program 122 maps transparent display 140 to palm 205A according to sensor data detected as hand 201 or a digit of hand 201 systematically moves along hand 205. For example, control program 122 maps palm 205A of hand 205 to side 210A of transparent display 140 based, at least in part, on sensor data received from sensors 124 as hand 201 moves around palm 205A. In an embodiment, sensors 150 provide sensor data associated with a movement detected on hand 201 along palm 205A of hand 205 used to map palm 205A to side 210A of transparent display 140.

For example, control program 122 maps the sensor data associated with palm 205A (e.g., sensor data indicating changes in topology of the palm of hand 205, muscle movement of hand 201, a muscle movement of a wrist or an arm of hand 201, and/or locations of hand 201 with respect to hand 205) to a grid representing palm 205A. In various embodiments, control program 122 receives sensor data capturing vibrations or muscle movements (e.g., in hand 201) due to the topology of palm 205A or changes a top surface of the user's palm 205A (e.g., hills due to finger bones and muscles or valleys due to palm lines or creases) and uses received sensor data to map palm 205A of hand 205.

In one example, control program 122 receives sensor data (e.g., as user input) from sensors 124 as a finger of hand 201 with a smart ring or a smart watch for computer 120 as the finger systematically moves around palm 205A from vibrations occurring in hand 201 as it traverses hand 205. Sensors 124 can include precision vibration sensing technology capable detecting minor or small vibrations due to bumps or creases in palm 205A. In various embodiments, control program 122 receives sensor data as a user's finger on hand 201 systematically moves around palm 205A. For example, control program 122 receives sensor data generated by the user's finger of hand 201 circling palm 205A in co-centric circles from the outer edges of palm 205A to the center of palm 205A, by zigzagging fingers of hand 201 from right to left across the outer edges of the palm, or by other similar motions of hand 201 to map palm 205A.

In various embodiments, control program 122 maps the grid for palm 205A to a corresponding grid for transparent display 140. For example, after control program 122 receives sensor data from sensors 124 as one or more fingers of hand 201 trace or slide over palm 205A then, accordingly, control program 122 maps a grid associated with the topology of palm 205A to a grid representing side 210A of transparent display 140. In various embodiments, control program 122 receives sensor data indicating a completion of the mapping of a side of hand 205, for example, by three taps of a finger or a thumb of hand 201 on a side of hand 205 after completing the traverse of hand 201 over the side of hand 205 mapped.

Control program 122 maps a backside 205B of hand 205 of the user to side 210B transparent display 140 (506). Using the methods discussed above in step 504, control program 122 receives sensor data from sensors 124 (e.g., in a smart ring, in a smart armband, fitness tracking device, etc.) as hand 201 traverses the top surface of hand 205's backside (e.g., backside 205B of hand 205 opposite palm 205A). In various embodiments, control program 122 maps the backside 205B of hand 205 to another side (e.g., side 210B) of transparent display 140. For example, control program 122 maps a grid point associated with a location on backside 205B of hand 205 to a corresponding grid point on side 210B of transparent display 140. In various embodiments, control program 122 maps each grid point associated with the topology of backside 205B of hand 205 (e.g., based, at least in part, on received sensor data of muscle movement, vibrations, or the like of a finger of hand 201 traversing backside 205B). In one embodiment, control program 122 receives sensor data from sensors 150 for mapping sides of hand 205 to one or more sides of transparent display 140. In an embodiment, control program 122 receives sensor data associated with one or both hands and one or more sides of a hand of the user for mapping hand 205 to transparent display 140. For example, sensors 150 can be a piezoelectric film on the surface of one or both sides of hand 205 providing sensor data on backside 205B for mapping to side 210B of transparent display 140.

In an embodiment, control program 122 maps each side of a two-sided remote input device (not depicted in FIG. 1) or a two-sided smart remote input device (e.g., UI 125 integrated in computer 120) to each side of transparent display 140. In one embodiment, control program 122 maps each side of a two-sided touch screen (e.g., UI 125) in computer 120 to each side of transparent display 140. In some embodiments, control program 122 maps a multi-sided remote input device to a multi-sided transparent display 140 (e.g., a rectangular remote input device for UI 125 with input buttons on four sides to a four sided transparent display 140). In an embodiment, control program 122 maps multiple sides of hand 205 to a multi-sided transparent display 140. For example, control program 122 maps an area or circumference around palm 205A, backside 205B, and the sides of hand 205 between them to a cylindrical transparent display 140. In other example, control program 122 maps palm 205A to one side of transparent display 140, backside 205B to a second side of transparent display 140, and an outside area of hand 205 between palm 205A and backside 205B on the little finger side of hand 205 to a third side of transparent display 140 (e.g., a three sided transparent display) based, at least in part, on a movement of a finger of hand 201 on hand 205.

Control program 122 receives sensor data associated with a mapped hand (508) such as hand 205. In various embodiments, control program 122 receives sensor data as a set of sensor data from sensors 124 associated with one or more motions of hand 201. A set of sensor data, which, maybe used as a set of user inputs, received from sensors 124 or from sensors 150 by control program 122 is a set of one or more sensor data or a set of one or more user inputs. For example, control program 122 may receive sensor data from sensors 124 or sensors 150 indicating a touch of a digit on hand 201 on hand 205, a tapping of a digit of hand 201 on hand 205, a slide of a digit of hand 201 on hand 205, a touch with a slide on one or more surfaces of hand 205, touches by multiple digits of hand 201 on hand 205, a slide of a digit of hand 201 a curled of a palm of hand 205, or the like. In an embodiment, control program 122 receives sensor data from sensors associated with hand 205. In one embodiment, control program 122 receives sensor data from sensors associated with or on both hand 201 and hand 205. In one example, control program 122 receives sensor data from sensors 124 indicating a tap on a location on the palm of hand 205 by a finger of hand 201. The location tapped, for example, corresponds to a content on transparent display 140 (e.g., determined based, at least in part, on mapping of hand 205 in steps 504 and 506). In various embodiments, control program 122 initiates by a proximity to transparent display 140 (e.g., to analyze received sensor data to determine actions or instructions related to or for transparent display 140). For example, control program 122 may be configured to start an analysis of sensor data when computer 120 is within a pre-set distance (e.g., ten feet) of transparent display 140 (e.g., determined using known location determination methods).

Control program 122 determines whether the sensor data is associated with a content (decision 510). In various embodiments, control program 122 includes the code and program routines to correlate sensor data associated with a motion of hand 201 on hand 205 with various actions of transparent display 140 such as unlock transparent display. For example, control program 122 may be configured to correlate running a finger of hand 201 over palm 205A of cupped hand 205 to unlocking transparent display. In various embodiments, control program 122 also includes instructions associating sensor data or a set of sensor data to transparent display 140 selecting and/or manipulating content on one or more sides of transparent display 140.

In response to determining that the sensor data is not associated with a content (no branch, decision 510), control program 122 sends instructions to perform action associated with sensor data (511) to transparent display 140. In various embodiments, control program 122 identifies sensor data associated with a movement of a digit of hand 201 with respect to hand 205 corresponding to an action such as unlock transparent display 140, lock transparent display 140, or to power off transparent display 140. For example, control program 122 receives sensor data from sensors 124 a cupped palm of hand 205 as a finger of hand 201 transverses the cupped palm of hand 205 indicating that an action (e.g., unlock transparent display 140), and response, control program 122 sends instructions to transparent display 140 to unlock.

In another example, control program 122 sends instructions to lock transparent display 140 in response to sensor data or user input from sensors 124 indicating a finger of hand 201 circles the outside of palm 201A. In yet another example, control program 122 receives sensor data from sensors 124 determining that a digit of hand 201 creates an X across a side of hand 205, and in response, sends instructions to power off transparent display 140. In an embodiment, control program 122 includes instructions for one or more actions associated with sensor data from sensors 150. For example, control program 122 determines that a fist of hand 201 detected by a piezoelectric film as sensor 150 on hand 201 and sends an instruction to transparent display 140 to lock.

In some embodiments, control program 122 receives a user input from UI 125 indicating an action of transparent display 140. For example, control program 122 receives a user input from UI 125 (e.g., a two-sided remote input device in computer 120) when a user presses a large button on a two-sided smart remote input device configured to unlock transparent display 140 and in response, control program 122 sends instructions to transparent display 140 to unlock. Similarly, when control program 122 receives a user selection of a power off icon on a two-sided touch screen for UI 125, then control program 122 sends instructions to transparent display 140 to power off. Control program 122 is not intended to be limited to the examples of received sensor data and UI 125 user inputs in the examples discussed above but may include other examples of other sensor data or other UI 125 inputs configured in control program 122 to actions of transparent display 140 not associated with a content on transparent display 140.

Control program 122 determines that the sensor data is associated with content (yes branch, decision 510). In various embodiments, control program 122 determines received sensor data (e.g., from either sensors 124 or sensors 150) is associated with a selection of one or more content or a manipulation of one or more content (e.g., moving, deleting, flipping, etc. on transparent display 140).

In various embodiments, control program 122 determines a selection of one or more content by a touch or a tap on a location of hand 205 by a finger of hand 201 mapped to one or more images, graphs, words, or other content on transparent display 140. For example, control program 122 receives sensor data indicating a tap of a finger on hand 201 on a location on palm 205A of hand 205 and determines a selection of the content on a side transparent display 140 corresponding to the location on hand 205 tapped by a finger on hand 201 (e.g., based on mapping of palm 205A of hand 205 to side 210A of transparent display 140 in step 504). In another example, control program 122 receives sensor data indicating that a finger on hand 201 circles an area on the palm of hand 205. In response, control program 122 determines that content on transparent display 140 corresponding to the area circled by the finger of hand 201 is selected (e.g., the selected content corresponds the area inside the circle on hand 205 by the finger of hand 201 based on mapping of palm 205A).

In some embodiments, control program 122 receives a user input on UI 125 indicating a selection of content on transparent display 140. For example, control program 122 receives a user from UI 125 as either a two-sided remote input device (e.g., included in computer 120 or independent of computer 120) or two-sided touch screen included in computer 120 indicating a selection or a selection of content and an action associated with selected content. In an example, a user selects a small button on UI 125 as a two-sided remote input device mapped to a content on one side of transparent display 140. The press of a small button in a grid of buttons on a side of UI 125 as a two-sided remote input device identifies a selection of the mapped content on transparent display 140. In some embodiments, control program 122 receives user input from both sides of UI 125 (e.g., either from buttons associated with content on both sides of the two-sided remote device for UI 125 or a touch on both sides of a two-sided touch screen for UI 125). Similarly, control program 122 receives a user input such as a touch on a two sided touch screen in computer 120 indicating a selection of content one transparent display 140 corresponding to the touched location on UI 125. In this example, the touch on UI 125 is in location that is not an icon for an action or symbol for a pull-down menu used to a user select and communicate actions (e.g., lock display, power off, etc.) to control program 122.

Control program 122 determines whether the sensor data is associated with more than one side of transparent display 140 (decision 512). Responsive to determining that received sensor data that is not associated with more than one side of transparent display 140 (no branch, decision 512), control program 122 sends instructions to manipulate and display content (514) to transparent display 140. In response to received sensor data from sensors 124 or sensors 150 associated with a gesture or motion of hand 201 on hand 205, control program 122 determines instructions to send to transparent display 140 to manipulate and display content. The instructions in control program 122 associated with sensor data may be to manipulate content (e.g., to move, delete, flip, etc.) and display content. In various embodiments, control program 122 determines how to manifest content or manipulate content on transparent display 140 in response to various received sensor data from sensors 124 and/or sensors 150. For example, as previously discussed, control program 122 based, at least in part, on received sensor data, determines a touch on a location on palm 205A of hand 205 by a digit of hand 201 includes a slide to a second location. In response, control program 122 sends instructions to transparent display 140 to move selected content to the second location (e.g., determined by sensor data and mapping of hand 205 to transparent display) and display selected content on the second location of transparent display 140 (e.g., as depicted in FIGS. 2A and 2B).

In another example, control program 122 sends instructions to transparent display 140 to delete a selected content (e.g., a graph) when sensor data from sensors 124 indicate three taps on a location hand 205 by a finger of hand 201. For example, a finger of hand 201 taps three times in the center of backside 205B of hand 205 and control program 122 sends instructions to erase the content (e.g., the graph) in the center of side 210B on transparent display 140.

In yet another example, control program 122 receives data from sensors 124 indicating a double tap in the center of the palm of hand 205 and accordingly, control program 122 sends instructions to transparent display 140 to transfer the content (e.g., a picture) corresponding to the double tapped location to the center of the front side 210A of transparent display 140.

Control program 122 is not limited to the manipulation of content or instructions corresponding to received sensor data as discussed in the examples above but, may include a number of other actions or manipulation of content on transparent display 140 in response to other sensor data received from sensors 124 and/or sensors 150 associated with movements of hand 201 on hand 205.

In some embodiments, control program 122 receives user input from UI 125 as either a two-sided remote input device or a two-sided touch screen in computer 120 indicating a manipulation and display of content on one side of transparent display 140. For example, control program 122 receives a user input such as a depression of a small button associated with content on a location of transparent display 140 and a selection of a large button associated with deleting content and in response, sends instructions to transparent display 140 to delete the selected content.

Control program 122 monitors sensors 124 and sensors 150 for additional sensor data (516). If additional sensor data is received by control program 122, the program returns to step 508. In an embodiment, control program 122 receives sensor data indicating an end of control program 122. For example, control program 122 receives sensor data indicating hand 201 swipes hand 201 up along the length of hand 205 and control program 122 ends.

In various embodiments, control program 122 receives sensor data that is associated with more than one side of transparent display 140 (yes branch, decision 512). For example, control program 122 may receive sensor data from one or more of sensors 124 or sensors 150 associated with two-sides of hand 205 indicating a selection of content and/or a manipulation of content associated with more than one side of transparent display 140.

For example, control program 122 in response to receiving sensor data indicating a double tap on a location on one side of hand 205 determines that the selected content should be flipped to the other side of transparent display 140 (e.g., the sensor data is associated with more than one side of transparent display 140). In another example, control program 122 may receive sensor data indicating touches on multiple sides of hand 205. As depicted in FIGS. 4A and 4B, sensor data indicates a touch by a finger on backside 205B of hand 205 and a touch on palm 205A associated with content on two sides of transparent display 140.

In an embodiment, control program 122 determines user inputs on UI 125 are associated with more than one side of UI 125 (e.g., when UI 125 is a two-sided remote input device or a two-sided touch screen). For example, when control program 122 receives in indication of a user pressing small button on each side of a two-sided smart remote device as UI 125 when the buttons are associated with a location on transparent display 140 then, control program 122 determines user inputs are associated with both sides of transparent display 140. Similarly, when control program 122 receives an indication of a user touch on each side of a two-sided touch screen (e.g., not on an icon for an action), then control program 122 determines the user input is associated with two sides of transparent display 140.

Responsive to determining sensor data is associated with more than one side of the hand 205; control program 122 determines content selected for each side of transparent display (522). In various embodiments, based, at least in part, on received sensor data, control program 122 determines if content on transparent display 140 is selected on one or more sides of transparent display 140. For example, computer 120 using control program 122 receives sensor data indicating the selection of a single content on one side of transparent display moving to a second side of transparent display 140. For example, control program 122 receives sensor data indicating a touch on a location on one side of hand 205 by a finger and a slide to a second location on the opposite side of hand 201 (e.g., as depicted in FIGS. 3A and 3B).

In another example, as depicted in FIGS. 4A and 4B, control program 122 receives sensor data associated with more than one content on more than one side of transparent display 140. In response to received sensor data from sensors in computer 120C (e.g., a smart watch or smart armband) indicating muscle movements associated with two digits of hand 201 on both palm 205A and backside 205B of hand 205, computer 120 using control program 122 (not depicted) determines that content is selected on both sides of transparent display 140. Based on sensor data indicating pointer finger of hand 201 is on a location of backside 205B of hand 205 corresponding to a mapped to content 411 (e.g., a picture of a flower) and sensor data indicating a thumb of hand 201 is on a location of palm 205A of hand 205 corresponding to mapped to content 412 (e.g., data or numbers) on side 210A of transparent display 140, control program 122 determines a content is selected on both sides of transparent display 140.

Control program 122 determines whether content is moving from one side of transparent display 140 to the other side of transparent display 140 (decision 524). Control program 122 determines that the content selected for each side of transparent display 140 is not moving from one side of transparent display 140 to the other side (no branch, decision 524) of transparent display 140 based, at least in part, on received sensor data. For example, as depicted in FIGS. 4A and 4B discussed above, control program 122 in computer 120C determines from received sensor data associated with the finger of hand 201 on palm 205A and the thumb of hand 201 on backside 205B of hand 205 corresponding to content 411 (e.g., a picture of a flower) on side 210B and content 412 (e.g., numbers) on side 21A of transparent display 140. Additionally, sensor data received by computer 120 indicates the finger of hand 201 slides downward to a second location on backside 205B of hand 205. At the same time, computer 120 receives sensor data indicating the thumb of hand 201 is sliding upward to a second location on palm 205A of hand 205. Computer 120 (e.g., using control program 122 not depicted) determines that neither content 411 nor content 412 is moving to another side of transparent display 140.

In one embodiment, control program 122 receives a user input on UI 125 where UI 125 is a two-sided touch screen for computer 120 or a two-sided remote input device indicating that content is manipulated on one side of transparent display 140. For example, control program 122 receives a user input associated with selection of a button associated with a location on each side of UI 125 and a larger button on the top of one side of the two-sided remote input device as UI 125 associated with a selection to move content. Control program 122 receives a user input indicating a target location by selection of a small button (e.g., mapped to a location) on the same side of two-sided remote input device UI 125 as the pressed larger button to move content.

Responsive to determining that content is not moving from one side of transparent display 140 to the other side of transparent display 140, control program 122 sends instructions to manipulate and display content (528) to transparent display 140. For example, as previously discussed with respect to FIGS. 4A and 4B, responsive to receiving sensor data indicating a downward movement of the finger of hand 201 on backside 205B, control program 122 determines a movement or transfer of content 411 (e.g., flower) downward to the mapped location on transparent display 140 corresponding to the second location of the finger after sliding on backside 205B. In the above example, simultaneously, in response to received sensor data, control program 122 determines a second location for content 412 (e.g., numbers) on side 210A of transparent display 140 corresponding to mapping of the second location of the thumb of hand 201 after sliding up on palm 205A of hand 205. In response to determining second locations for content 411 and content 412, control program 122 sends instructions to transparent display 140 to perform movements of content 411 and content 412 and then, to display moved content (e.g., content 411 and content 412 in second locations).

In some embodiments, control program 122 receives one or more inputs on UI 125 as a two-sided remote input device or a two-sided touch screen to move one or more content from one location on a side of transparent display 140 to another location on the same side of transparent display 140. In response, control program 122 sends instructions to transparent display 140 to move selected content to a second location on the same side of transparent display 140 for display.

Control program 122 monitors sensors 124 and sensors 150 for additional sensor data (530). If additional sensor data is received by control program 122, the program returns to step 508. In an embodiment, control program 122 receives sensor data from a user indicating the end of the program, for example, if received sensor data indicates hand 201 swipes hand 201 up along the length of hand 205, control program 122 ends. In an embodiment, control program 122 receives a user input on UI 125 as a selection of a button or an icon indicating a program end.

Control program 122 determines that content is moving from one side of transparent display 140 to the other side of transparent display 140 (yes branch, decision 524). In various embodiments, control program 122 determines that content is moving from one side of transparent display 140, based, at least in part, on received sensor data. In an embodiment, control program 122 determines that content is moving from one side of transparent display 140 to the other side of transparent display 140 based on a user input on a two-sided remote electronic device as UI 125 or on a two-sided touch screen for UI 125 in computer 120.

In one embodiment, control program 122 receives sensor data indicating that a digit of hand 201 slides around a side of the palm or edge of hand 205 to a second location on an opposite side of hand 205. For example, as depicted in FIGS. 3A and 3B, a finger on hand 201 taps or touches the palm of hand 205 and then, slides around the side of the palm of hand 205 to the backside of hand 205. In response, control program 122 receives sensor data from sensors 124 in computer 120 (e.g., a smart ring) associated with the first location on the palm mapped to a location and content on front side 210A. In this example, control program 122 also receives sensor data associated with the slide to a second location on the backside of hand 205 mapped to a second location on side 210B of transparent display 140.

In an embodiment, control program 122 receives sensor data from sensors 124 or 150 configured to flip a selected content from one side of transparent display 140 to the other or a second side of transparent display 140. For example, control program 122 receives sensor data from sensors 124 or sensors 150 indicating to control program 122 that the content displayed on each side of transparent display 140 is flipped to the other side of transparent display 140. For example, when control program 122 receives sensor data indicating hand 205 has flipped over 180 degrees while a finger on hand 201 approximately orthogonal to the palm of hand 205 also flips 180 degrees (e.g., from pointing up to pointing down on hand 205), control program 122 determines an action, such as flipping content displayed on front side of transparent display 140 to the backside of transparent display 140 and vice versa (e.g., backside content flipped to front side). Flipping sides of transparent display 140, for example, includes flipping or moving images or content displayed on the backside 210B of transparent display 140 to front side 210A of transparent display 140. Control program 122 is not limited to determining a movement or manipulation of content according to the examples discussed above but may receive other sensor data correlated to other actions or manipulation of content on transparent display 140.

In one embodiment, control program 122 receives input from UI 125 (e.g., input to UI 125 as either a two-sided touch screen or a two-sided remote electronic device included in or with computer 120) indicating a flip or a move of content from one side of transparent display 140 to the other side of transparent display 140. For example, UI 125 as a two-sided remote input device receives a user selection on a small button associated with a location of content on transparent display 140 and a selection of a larger button indicating a flip or a transfer of the selected content to a corresponding location on the other side of transparent display 140. A similar method of selecting a content and an icon or a selection in a drop-down menu indicating a transfer of the content to a same or similar location on the other side of transparent display 140 can be done with UI 125 as a two-sided touch screen.

In various embodiments, control program 122 in response to receiving sensor data indicating a transfer of content from a front side 210A to side 210B or vice versa on transparent display 140, control program 122 determines an orientation of content on the second side of transparent display 140 (526). In various embodiments, control program 122 may need to flip or reverse the orientation of content such as words, symbols, graphs, and the like for the content to be properly displayed for consumption or reading from the other side of transparent display 140. Control program 122 determines the orientation of content on the second side of transparent display 140.

For example, control program 122 determines an orientation of content transferring to a second side of transparent display 140 providing a user viewing the second side of transparent display 140 the same view or orientation of the content as a user viewing the content from the first side of transparent display 140. For example, as depicted in FIG. 3B, control program 122 sends instructions to transparent display 140 to orient content 303 as content 303 is moved from side 210A to side 210B of transparent display 140. In FIG. 3B, content 303 is depicted on side 210A (top) and content 303 is depicted on side 210B (bottom) as a user standing on side 210A would see content 303 after orienting the content (e.g., content on side 210B would appear backwards or reversed to the user viewing from the front side 210A of transparent display 140).

After orienting content, control program 122 sends instructions to manipulate and display content (528) to transparent display 140 as discussed above. For example, when control program 122 receives sensor data associated with a double tap of a location on one side of palm 205A mapped to a content such as a graph (not depicted) then, control program 122 sends instructions for the selected content (e.g., the graph) on a side of transparent display 140 (e.g., on front side 210A) is to be flipped or transferred to the other side (e,g, back side 210B) of transparent display 140 (e.g., to a corresponding location on the opposite side of transparent display 140) and displayed. In another example, control program 122 sends instructions to flip and display the content on each side of transparent display 140 to the other side of transparent display 140 responsive to receiving a selection of a button or an icon on UI 125 configured to reverse or flip content displayed on each side of transparent display 140 (e.g., content on front side 210A of transparent display 140 transfers to backside 210B of transparent display 140).

In various embodiments, control program 122 monitors sensors for additional sensor data (530). If no additional sensor data is received, control program 122 ends unless additional sensor data is received, in which case, control program 122 returns to step 508. In some embodiments, control program 122 monitors UI 125 as a two-sided remote input device or a two-sided touch screen for a user input associated with transparent display 140.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s).

Figure 6:
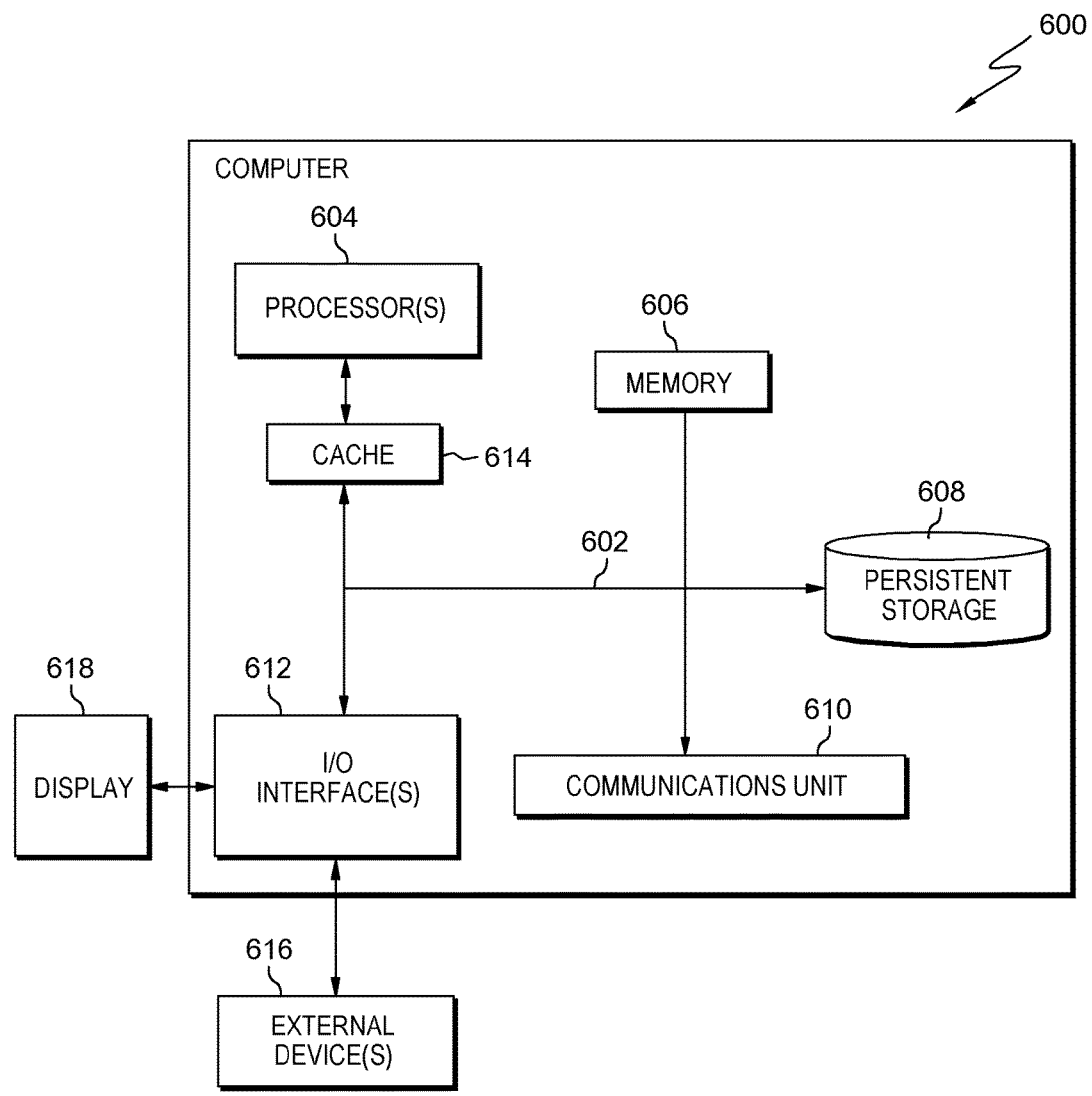
FIG. 6 is a block diagram depicting components of a computer system in accordance with at least one embodiment of the present invention.

FIG. 6 is block diagram 600 depicting components of a computer system in accordance with at least one embodiment of the present invention. As depicted, FIG. 6 depicts the components of a computer system, which is an example of a system such as computer 120 within distributed data processing environment 100, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Computer 120 can include processor(s) 604, cache 614, memory 606, persistent storage 608, communications unit 610, input/output (I/O) interface(s) 612 and communications fabric 602. Communications fabric 602 provides communications between cache 614, memory 606, persistent storage 608, communications unit 610 and input/output (I/O) interface(s) 612.

Communications fabric 602 can be implemented with any architecture designed for passing data and/or control information between processors (such as microprocessors, communications and network processors, etc.), system memory, peripheral devices and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 614 is a fast memory that enhances the performance of processor(s) 604 by holding recently accessed data and near recently accessed data, from memory 606.

Program instructions and data used to practice embodiments of the present invention are stored in persistent storage 608 for execution and/or access by one or more of the respective processor(s) 604 via cache 614. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory or any other computer readable storage media that is capable of storing program instructions or digital information.

The media used by persistent storage 608 may also be removable. For example, a removable hard drive may be used for persistent storage 608. Other examples include optical and magnetic disks, thumb drives and smart cards that are inserted into a drive for transfer onto another computer readable storage medium that is part of persistent storage 608.

Communications unit 610, in these examples, provides for communications with other data processing systems or devices, including resources of computer 120, sensors 150, and transparent display 140 and other computing devices not shown in FIG. 1. In these examples, communications unit 610 includes one or more network interface cards. Communications unit 610 may provide communications with either or both physical and wireless communications links. Program instructions and data used to practice embodiments of the present invention may be downloaded to persistent storage 608 through communications unit 610.

I/O interface(s) 612 allows for input and output of data with other devices that may be connected to computer 120, sensors 150, or transparent display 140. For example, I/O interface(s) 612 may provide a connection to external device(s) 616 such as a keyboard, a keypad, a touch screen, a microphone, a digital camera and/or some other suitable input device. External device(s) 616 can also include portable computer readable storage media, for example, devices such as thumb drives, portable optical or magnetic disks and memory cards. Software and data used to practice embodiments of the present invention can be stored on such portable computer readable storage media and can be loaded onto persistent storage 608 via I/O interface(s) 612. I/O interface(s) 612 also connect to a display 618.

Display 618 provides a mechanism to display data to a user and may be, for example, a computer monitor. Display 618 can also function as a two-sided touch screen, such as a display of a tablet computer or a transparent display 140.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method comprising:
    mapping, by one or more computer processors, a front side of a transparent display to a first side of a first hand of a user and a back side of the transparent display to a second side of the first hand, wherein the mapping is based, at least in part, on one or more sets of mapping sensor data associated with a plurality of systematic movements of a second hand of the user on the first side and the second side of the first hand of the user;
    receiving, by one or more computer processors, a first set of sensor data associated with one or more movements of the second hand of user associated to the first side of the first hand of the user;
    determining, by one or more computer processors, the first set of sensor data corresponds to at least one content on the transparent display;
    determining, by one or more computer processors, whether the first set of sensor data is associated with more than one side of the transparent display; and
    responsive to determining the first set of sensor data is not associated with more than one side of the transparent display, determining, by one or more computer processors, a manipulation of the at least one content on a side of the transparent display corresponding to the first set of sensor data.

2. The method of claim 1, further comprises:
    sending, by one or more computer processors, one or more instructions to the transparent display to display the at least one content based, at least in part, on the determined manipulation of the at least one content and the mapping of the transparent display.

3. The method of claim 1, wherein the one or more sets of mapping sensor data and the first set of sensor data are determined based on at least one of muscle movements or vibrations detected from the plurality of systematic movements of the second hand of the user on the first side of the first hand of the user and the one or more movements of the second hand of the user on the first hand of the user.

4. The method of claim 1, wherein the one or more sets of mapping sensor data and the first set of sensor data are received from one or more sensors in at least one of: a smart ring, a smart watch, a fitness tracking device, a smart armband, or a sensor glove with processing capability associated with the second hand.

5. The method of claim 1, wherein mapping the first side of the transparent display to the first side of a first hand of the user and the back side of the transparent display to the second side of the first hand comprises:
receiving, by one or more computer processors, a first set of mapping sensor data associated with a plurality of systematic movements of the second hand of the user on the first side of the first hand of the user, wherein the first side of the first hand is a palm of the first hand;
mapping, by one or more computer processors, the first set of mapping sensor data to the first side of the first hand of the user; and
mapping, by one or more computer processors, the first side of the first hand of the user to the front side of the transparent display.

6. The method of claim 5, further comprises:
receiving, by one or more computer processors, a second set of mapping sensor data associated with a plurality of movements of the second hand of the user on the second side of the first hand of the user, wherein the second side of the first hand is a backside of the first hand;
mapping, by one or more computer processors, the second set of mapping sensor data to the second side of the first hand of the user; and
mapping, by one or more computer processors, the second side of the first hand of the user to the back side of the transparent display.

7. The method of claim 1, wherein, determining whether the first set of sensor data is associated with more than one side of the transparent display comprises:
determining, by one or more computer processors, that the at least one content is moving from one side of the transparent display to a back side of the transparent display based, at least in part, on the first set of sensor data, wherein the transparent display is a large transparent display a user cannot reach around;
determining, by one or more computer processors, an orientation of the at least one content on the back side of the transparent display; and
sending, by one or more computer processors, one or more instructions to the transparent display to display the at least one content on the back side of the transparent display based, at least in part, on the first set of sensor data.

8. The method of claim 1, further comprising:
determining, by one or more computer processors, that the first set of sensor data is not associated with at least one content;
determining, by one or more computer processors, a transparent display action, wherein the transparent display action is one of unlocking the transparent display, locking the transparent display, and powering off the transparent display; and
sending, by one or more computer processors, to the transparent display one or more instructions to perform the transparent display action.

9. The method of claim 1, wherein mapping the transparent display is to a two-sided remote input device.

10. The method of claim 9, wherein the mapping the transparent display to the two-sided remote input device comprises:
mapping, by one or more computer processors, a grid of buttons on a first side of the two-sided remote input device to a grid on a front side of the transparent display; and
mapping, by one or more computer processors, a grid of buttons on a second side of the two-sided remote input device to a grid on a back side of the transparent display.

11. The method of claim 10, further comprising a row of buttons on the two-sided remote input device where each button provides one of an instruction to unlock the transparent display, lock the transparent display, and power off the transparent display.

12. A computer program product comprising:
one or more computer readable storage media and program instructions stored on the one or more computer readable storage device, the program instructions executable by a processor, the program instructions comprising instructions for:
mapping a front side of a transparent display to a first side of a first hand of a user and a back side of the transparent display to a second side of the first hand, wherein the mapping is based, at least in part, on one or more sets of mapping sensor data associated with a plurality of systematic movements of a second hand of the user on the first side and the second side of the first hand of the user;
receiving a first set of sensor data associated with one or more movements of the second hand of user associated to the first side of the first hand of the user;
determining the first set of sensor data corresponds to at least one content on the transparent display;
determining whether the first set of sensor data is associated with more than one side of the transparent display; and
responsive to determining the first set of sensor data is not associated with more than one side of the transparent display, determining, by one or more computer processors, a manipulation of the at least one content on a side of the transparent display corresponding to the first set of sensor data.

13. The computer program product of claim 12, further comprising sending one or more instructions to the transparent display to display the at least one content based, at least in part, on the determined manipulation of the at least one content and the mapping of the transparent display.

14. The computer program product of claim 12, wherein the one or more sets of mapping sensor data and the first set of sensor data are determined based on at least one of muscle movements or vibrations detected from the plurality of systematic movements of the second hand of the user on the first side of the first hand of the user and the one or more movements of the second hand of the user on the first hand of the user.

15. The computer program product of claim 12, wherein mapping the front side of the transparent display to the first side of the first hand of the user and the back side of the transparent display to the second side of the first hand comprises:
- receiving a first set of mapping sensor data associated with a plurality of systematic movements of the second hand of the user on the first side of the first hand of the user;
- mapping the first set of mapping sensor data to the first side of the first hand of the user; and
- mapping the first side of the first hand of the user to the front side of the transparent display.

16. The computer program product of claim 12, wherein determining whether the first set of sensor data is associated with more than one side of the transparent display comprises:
- determining, by one or more computer processors, that the at least one content is moving from one side of the transparent display to a back side of the transparent display based, at least in part, on the first set of sensor data;
- determining, by one or more computer processors, an orientation of the at least one content on the back side of the transparent display; and
- sending, by one or more computer processors, one or more instructions to the transparent display to display the at least one content on the back side of the transparent display based, at least in part, on the first set of sensor data.

17. The computer program product of claim 12, further comprising:
- determining that the first set of sensor data is not associated with at least one content;
- determining a transparent display action, wherein the transparent display action is one of unlocking the transparent display, locking the transparent display, and powering off the transparent display; and
- sending to the transparent display one or more instructions to perform the transparent display action.

18. A computer system comprising:
one or more computer processors;
one or more computer readable storage media; and
program instructions stored on the one or more computer readable storage media for execution by at least one of the one or more computer processors, the program instructions comprising instructions for:
- mapping a front side of a transparent display to a first side of a first hand of a user and a back side of the transparent display to a second side of the first hand, wherein the mapping is based, at least in part, on one or more sets of mapping sensor data associated with a plurality of systematic movements of a second hand of the user on the first side and the second side of the first hand of the user;
- receiving a first set of sensor data associated with one or more movements of the second hand of user associated to the first side of the first hand of the user;

determining the first set of sensor data corresponds to at least one content on the transparent display;
- determining whether the first set of sensor data is associated with more than one side of the transparent display; and responsive to determining the first set of sensor data is not associated with more than one side of the transparent display, determining, by one or more computer processors, a manipulation of the at least one content on a side of the transparent display corresponding to the first set of sensor data.

19. The computer system of claim 18, wherein determining whether the first set of sensor data is associated with more than one side of the transparent display;
- determining, by one or more computer processors, that the at least one content is moving from one side of the transparent display to a back side of the transparent display based, at least in part, on the first set of sensor data;
- determining, by one or more computer processors, an orientation of the at least one content on the back side of the transparent display; and
- sending, by one or more computer processors, one or more instructions to the transparent display to display the at least one content on the back side of the transparent display based, at least in part, on the first set of sensor data.

20. The computer system of claim 18, further comprising:
determining that the first set of sensor data is not associated with at least one content;
determining a transparent display action, wherein the transparent display action is one of unlocking the transparent display, locking the transparent display, and powering off the transparent display; and
sending to the transparent display one or more instructions to perform the transparent display action.

* * * * *